(12) United States Patent
Jia et al.

(10) Patent No.: US 11,393,113 B2
(45) Date of Patent: Jul. 19, 2022

(54) HOLE FILLING FOR DEPTH IMAGE BASED RENDERING

(71) Applicant: Dolby Laboratories Licensing Corporation, San Francisco, CA (US)

(72) Inventors: Wenhui Jia, Dublin, CA (US); Haricharan Lakshman, Sunnyvale, CA (US); Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 103 days.

(21) Appl. No.: 16/800,861

(22) Filed: Feb. 25, 2020

(65) Prior Publication Data
US 2020/0279384 A1  Sep. 3, 2020

Related U.S. Application Data

(60) Provisional application No. 62/811,956, filed on Feb. 28, 2019.

(51) Int. Cl.
*G06T 7/529* (2017.01)
*H04N 19/597* (2014.01)
(Continued)

(52) U.S. Cl.
CPC .............. *G06T 7/529* (2017.01); *G06T 7/13* (2017.01); *G06T 7/194* (2017.01); *G06T 15/04* (2013.01);
(Continued)

(58) Field of Classification Search
CPC ........... G06T 7/529; G06T 7/194; G06T 7/13; G06T 15/04; G06T 2200/28; G06T 2207/10028; H04N 19/597
See application file for complete search history.

(56) References Cited

U.S. PATENT DOCUMENTS 8,253,740 B2   8/2012   Varekamp
8,611,642 B2   12/2013  Wang
(Continued)

FOREIGN PATENT DOCUMENTS

CN   106028020   10/2016
CN   107240073   10/2017
(Continued)

OTHER PUBLICATIONS

Criminisi, A. et al. "Region Filling and Object Removal by Exemplar-Based Image Inpainting" IEEE Transactions on Image Processing, vol. 13, No. 9, Sep. 2004, pp. 1200-1212.
(Continued)

*Primary Examiner* — Terrell M Robinson

(57) ABSTRACT

Bordering pixels delineating a texture hole region in an image are identified. Depth values of the bordering pixels are recorded. The depth values are automatically clustered into two depth value clusters with a depth value threshold separating the two depth value clusters. A subset of bordering background pixels is identified in the bordering pixels as those with depth values in one of the two depth value clusters that is declared as a background depth value cluster. The subset of bordering background pixels is used to predict texture hole pixel values in the texture hole region based on multiple candidate prediction directions. Quality indicator values are computed for the multiple candidate prediction directions and used to select a specific candidate prediction direction for filling in final texture hole pixel values in the texture hole region of the image.

20 Claims, 18 Drawing Sheets

(51) Int. Cl.
*G06T 7/194* (2017.01)
*G06T 7/13* (2017.01)
*G06T 15/04* (2011.01)

(52) U.S. Cl.
CPC ........ *H04N 19/597* (2014.11); *G06T 2200/28* (2013.01); *G06T 2207/10028* (2013.01)

(56) References Cited

U.S. PATENT DOCUMENTS

| | | | |
|---|---|---|---|
| 9,654,765 B2 | 5/2017 | Nguyen | |
| 9,930,363 B2 | 3/2018 | Rusanovskyy | |
| 2010/0329358 A1* | 12/2010 | Zhang | H04N 19/187 375/E7.02 |
| 2011/0157229 A1 | 6/2011 | Ni | |
| 2011/0293137 A1 | 12/2011 | Gurman | |
| 2013/0072299 A1* | 3/2013 | Lee | H04N 19/513 463/32 |
| 2013/0127844 A1* | 5/2013 | Koeppel | G06T 15/04 345/419 |
| 2013/0127988 A1 | 5/2013 | Wang | |
| 2014/0002595 A1 | 1/2014 | Po | |
| 2014/0098100 A1* | 4/2014 | Dane | H04N 13/302 345/427 |
| 2014/0177927 A1* | 6/2014 | Shieh | G06T 7/593 382/108 |
| 2015/0215600 A1 | 7/2015 | Norkin | |
| 2016/0373715 A1 | 12/2016 | Nguyen | |
| 2018/0357813 A1* | 12/2018 | Hong | G06T 19/20 |
| 2019/0102886 A1* | 4/2019 | Guigues | G06T 7/90 |

FOREIGN PATENT DOCUMENTS

| | | |
|---|---|---|
| EP | 2775723 | 9/2014 |
| WO | 2009091563 | 7/2009 |
| WO | 2012010220 | 1/2012 |

OTHER PUBLICATIONS

Li, S. et al "Hole filling with Multiple Reference Views in DIBR View Synthesis" IEEE Transactions on Multimedia, vol. 20, No. 8, Aug. 2018, pp. 1948-1959.

Lu, Z. et al "A Novel Filling Disocclusion Method Based on Background Extraction in Depth-Image-Based-Rendering" Latest Trends in Applied Informatics and Computing, 2012.

Luo, G. et al "Foreground Removal Approach for Hole Filling in 3D Video and FVV Synthesis" IEEE Transactions on Circuits and Systems for Video Technology, vol. 27, No. 10, Oct. 2017, pp. 2118-2131.

Oh, Kwan-Jung, et al "Hole-Filling Method Using Depth Based In-Painting for View Synthesis in Free Viewpoint Television (FTV) and 3D Video" Jun. 2009, pp. 1-6.

Po, Lai-Man, et al., "A New Multidirectional Extrapolation Hole-Filling Method for Depth-Mage-Based Rendering," 2011 18th IEEE International Conference on Image Processing.

Tauber, Z.et al "Review and Preview: Disocclusion by Inpainting for Image-based Rendering," IEEE Transactions on Systems, Man, and Cybernetics, Part C, vol. 37, Issue 4, pp. 527-540, Jul. 2007.

Xu, X. et al "Depth-Aided Exemplar-based Hole Filling for DIBR View Synthesis" IEEE, pp. 2840-2843, May 2013.

Yen, Shwu-Huey, et al "Direction Hole-Filling Method for a 3D View Generator" vol. 11, Issue 2, 2015.

\* cited by examiner identify bordering pixels of a texture hole region
412 cluster the bordering pixels into two pixel clusters: foreground and background 414 use multi-prediction-directions and background pixels to fill in the texture hole region 416 select a winner among the prediction directions to fill in the texture hole regions 418

FIG. 4B

```
identify bordering pixels delineating a texture hole
region in an image 442
              │
record depth values of the bordering pixels 444
              │
cluster the depth values into two depth value
clusters with a depth value threshold 446
              │
identify a subset of bordering background pixels
448
              │
use the subset of bordering background pixels to
Predict based on multi-prediction-directions 450
              │
compute quality indicator values for the
multi-prediction-directions 452
              │
select a winner prediction direction 454
```

FIG. 4E

```
identify bordering pixels of a texture hole region in
an image 462
```
↓
```
cluster the bordering pixels into two pixel
clusters 464
```
↓
```
use multi-prediction-directions and bordering
background pixels for hole filling operations 466
```
↓
```
select a winning prediction direction among all the
multi-prediction-directions 468
```
↓
```
use the winning prediction direction to fill the
hole regions with the background pixels 470
```

FIG. 4F identify first non-hole pixels of a texture hole region in an image 482 record positions and depth values of the first non-hole pixels 484 cluster the first non-hole pixels into two pixel clusters 486

FIG. 4G

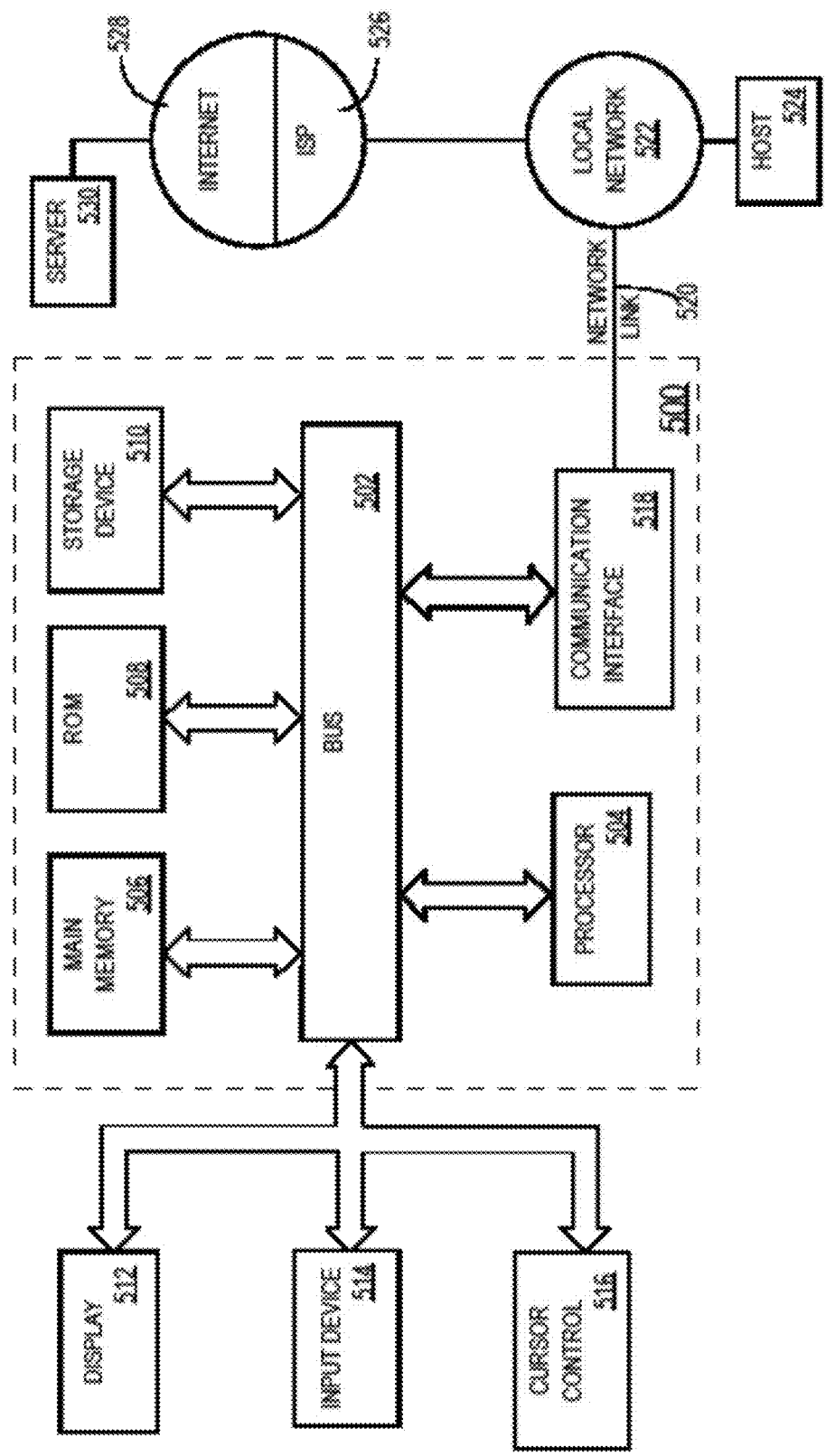

HOLE FILLING FOR DEPTH IMAGE BASED RENDERING

CROSS REFERENCE TO RELATED APPLICATION

This application claims priority to U.S. Provisional Application No. 62/811,956, filed on Feb. 28, 2019, which is incorporated by reference in its entirety.

TECHNOLOGY

The present invention relates generally to image coding and rendering, and in particular, to hole filling for depth image based rendering.

BACKGROUND

View synthesis is used in applications such as three-dimensional (3D) TV, 360-degree video, volumetric video, virtual reality (VR), augmented reality (AR), and so forth.

As a compromise between geometry based rendering and image based rendering, depth image based rendering (DIBR) is becoming popular because of availability of depth sensors and acceptable amount of data for practical implementations. In DIBR, virtual views are synthesized from existing views with their associated depth information. The existing views are warped to a depicted 3D world and then back projected to a target view position. As a result, background area occluded by a foreground object in an existing view might be disoccluded (without any available image data from the existing views) in a target view from the target view position, thereby creating holes in the target view. In addition, discontinuities in depth image(s) can also cause holes in synthesized views. As the total number of views to be encoded or transmitted in video signals is reduced or minimized in real video display applications, areas of holes in synthesized views generated from the reduced or minimized number of views become relatively large and relatively numerous, thereby creating readily noticeable visual artifacts.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A through FIG. 4G illustrate example process flows; and

FIG. 5 illustrates an example hardware platform on which a computer or a computing device as described herein may be implemented.

DESCRIPTION OF EXAMPLE EMBODIMENTS

Figure 1A:
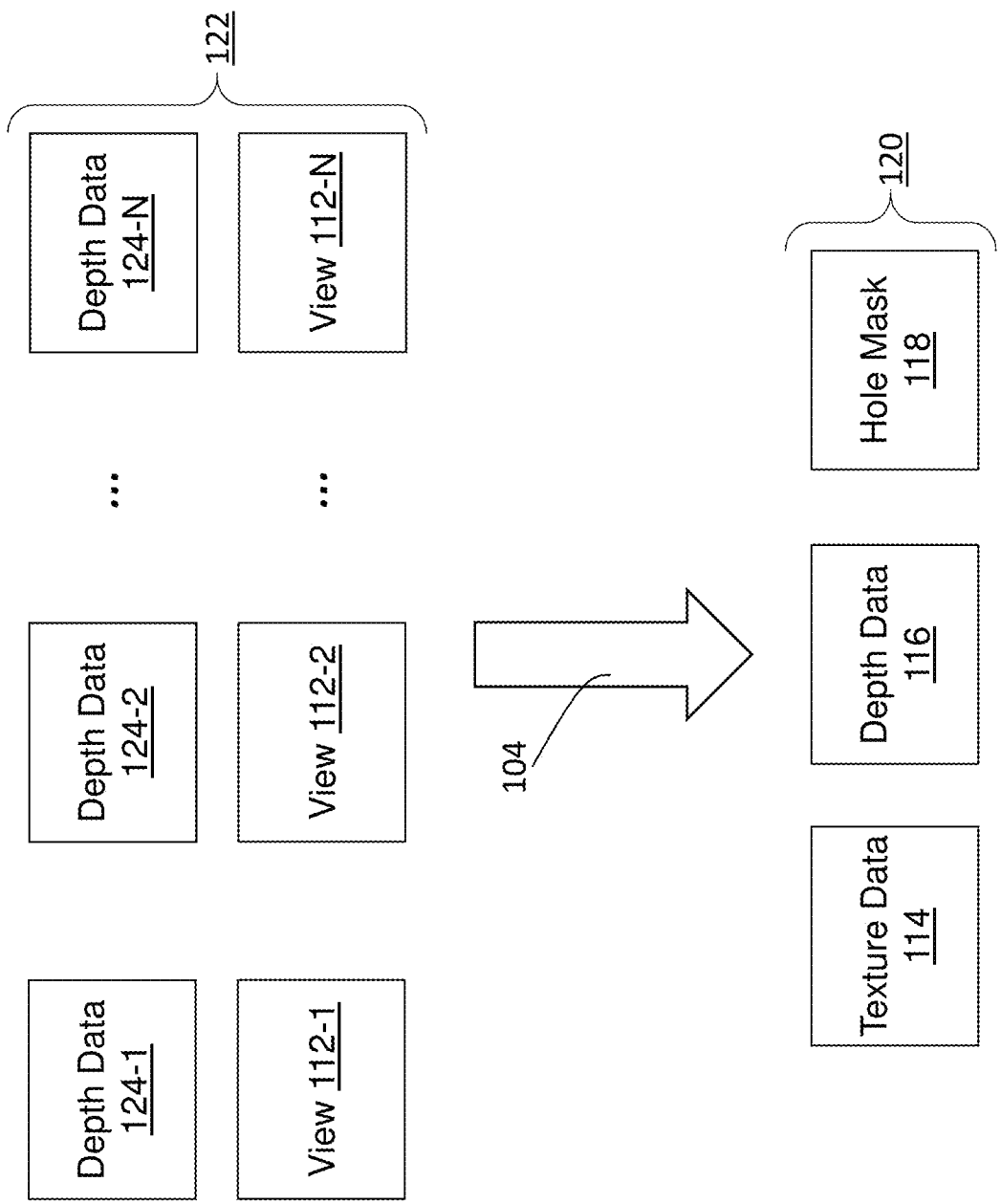
FIG. 1A illustrates an example synthesized view.

Example embodiments, which relate to hole filling for depth image based rendering, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
1. GENERAL OVERVIEW
2. SYNTHESIZED VIEWS
3. SYNTHESIZED TEXTURE DATA AND HOLE MASK
4. PREDICTION DIRECTIONS AND REFERENCES
5. PARALLEL HOLE-FILLING OPERATIONS
6. EXAMPLE VIDEO STREAMING SERVERS AND CLIENTS
7. EXAMPLE PROCESS FLOWS
8. IMPLEMENTATION MECHANISMS—HARDWARE OVERVIEW
9. EQUIVALENTS, EXTENSIONS, ALTERNATIVES AND MISCELLANEOUS

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Synthesized images generated from pre-synthesized multi-view images may contain texture hole regions that are disoccluded from previously occluded texture regions in the pre-synthesized multi-view images.

Techniques as described herein can be used to fill in pixel values in the texture hole regions. A texture hole mask can be used to identify existences and locations of any texture hole regions in a synthesized image.

Background pixels (e.g., bordering background pixels, nearest background pixels to a texture hole pixel, etc.) used for predicting pixel values in each texture hole region or a texture hole pixel therein may be distinguished from non-background pixels (e.g., bordering foreground pixels, nearest foreground pixels to a texture hole pixel, etc.) by automatic clustering or segmentation operations.

In some operational scenarios, predictions of pixel values in the texture hole region with the background pixels may be tried with multiple candidate directions. These predictions with different candidate directions can be evaluated with quality measures or indicators to determine or select the best direction for prediction. The best direction for prediction as determined by these quality measures or indicator can be used to propagate pixel values of the background pixels into the texture hole region or the texture hole pixel therein.

In some operational scenarios, hole-filling operations as described herein can be performed with a relatively high level of parallelism or concurrency by digital signal processors (DSPs) or graphics processing units (GPUs). For example, these hole-filling operations may be performed in parallel for multiple texture hole regions, for multiple texture hole pixels, and so forth, so long as computing resources such as processing threads of DSPs or GPUs are available. The pixel value of a texture hole pixel as described herein can be filled with that of a specific bordering or nearest background pixel (e.g., available along a filling order, available with a prediction direction, etc.). Additionally, optionally or alternatively, the pixel value of a texture hole pixel as described herein can be filled with an average pixel value of some or all background pixels (e.g., some or all bordering background pixels available along a filling order, etc.) applicable to the texture hole pixel.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Synthesized Views

FIG. 1A illustrates an example synthesized view 120 derived from one or more pre-synthesized views 112-1, 112-2, . . . 112-N, where N is an integer greater than zero (0). The one or more pre-synthesized views (112-1, 112-2, . . . 112-N) correspond to one or more pre-synthesized depth images 124-1, 124-2, . . . 124-N, respectively.

Each of the pre-synthesized views (112-1, 112-2, . . . 112-N) may be an image (or image frame) generated from image data acquired with one or more of: cameras, image sensors, 3D rendering methods, computer-implemented graphics generation/rendering methods, and so forth. Each of the pre-synthesized depth images (124-1, 124-2, . . . 124-N) may comprise depth information generated from depth data acquired with one or more of: multi-angle image sensors, depth sensors, triangulation, range imaging, radar, coded aperture, and so forth.

By way of example but not limitation, an array of physical cameras, virtual cameras, depth sensors, etc., located at one or more view positions may be used to capture image and depth information of the same physical or virtual scene from different view directions at a specific time point. The captured image and depth information at the specific time point may be processed to generate the pre-synthesized views (112-1, 112-2, . . . 112-N) and the pre-synthesized depth images (124-1, 124-2, . . . 124-N) corresponding to a plurality of different combinations of view positions and/or view directions in reference to the physical or virtual scene.

Each pre-synthesized view in the pre-synthesized views (112-1, 112-2, . . . 112-N) corresponds to a respective pre-synthesized depth image in the depth images (124-1, 124-2, . . . 124-N). The pre-synthesized view and the respective pre-synthesized depth image may respectively contain image data and depth data of the physical or virtual scene along a specific view direction from a specific view position. In other words, the respective pre-synthesized depth image comprises depth information for some or all pixels represented in the pre-synthesized view. Individual depth information (for a pixel represented in the pre-synthesized view) in the respective pre-synthesized depth image may be a distance value (or z-value) along the specific view direction from the specific view position, a disparity value in reference to a zero-disparity plane perpendicularly located at a certain distance from the specific view position along the specific view direction, and so forth.

In some embodiments, the pre-synthesized views (112-1, 112-2, . . . 112-N) and/or the pre-synthesized depth images (124-1, 124-2, . . . 124-N) are included in a multi-view image 122.

The synthesized view (120) can be derived from the pre-synthesized views (112-1, 112-2, . . . 112-N) by performing DIBR operations 104 on the pre-synthesized views (112-1, 112-2, . . . 112-N).

For example, the synthesized view (120) may represent a target view of what the physical or virtual scene has been depicted in the pre-synthesized views (112-1, 112-2, . . . 112-N). The target view may be from a target view position along a target view direction, which are different from any combination of view position and view direction as represented in any of the pre-synthesized views (112-1, 112-2, . . . 112-N).

Each pre-synthesized view in the pre-synthesized views (112-1, 112-2, . . . 112-N) from a specific view position along a specific view direction can be warped by the DIBR operations (104) into a warped image from the target view position along the target view direction based on depth information of pixels represented in the pre-synthesized view. One or more of these warped images can be selected, weighted/unweighted, composed, synthesized, etc., into the synthesized view (120).

Image areas such as a background area occluded by a foreground object in a pre-synthesized view in some or all of the pre-synthesized views (112-1, 112-2, . . . 112-N) may be disoccluded (but without any available image data from the existing views) in the target view from the target view position, thereby creating holes in the target view. In addition, discontinuities in the pre-synthesized depth images (124-1, 124-2, . . . 124-N) can also cause holes in the synthesized view (120).

In some embodiments, as a result of the DIBR operations (104), synthesized texture data 114, associated depth data 116 (which indicates depth information for pixels represented in the texture data (114)) and a texture hole mask 118 (which indicates where holes are in the texture data (114)) are generated for the synthesized view (120). The texture hole mask (118) may be a binary mask comprising an individual binary value for each texture pixel in some or all texture pixels of the synthesized texture data (114). The individual binary value for each such pixel in the texture hole mask (118) indicates whether a valid pixel value exists for the pixel.

3. Synthesized Texture Data and Hole Mask

Figure 1B:
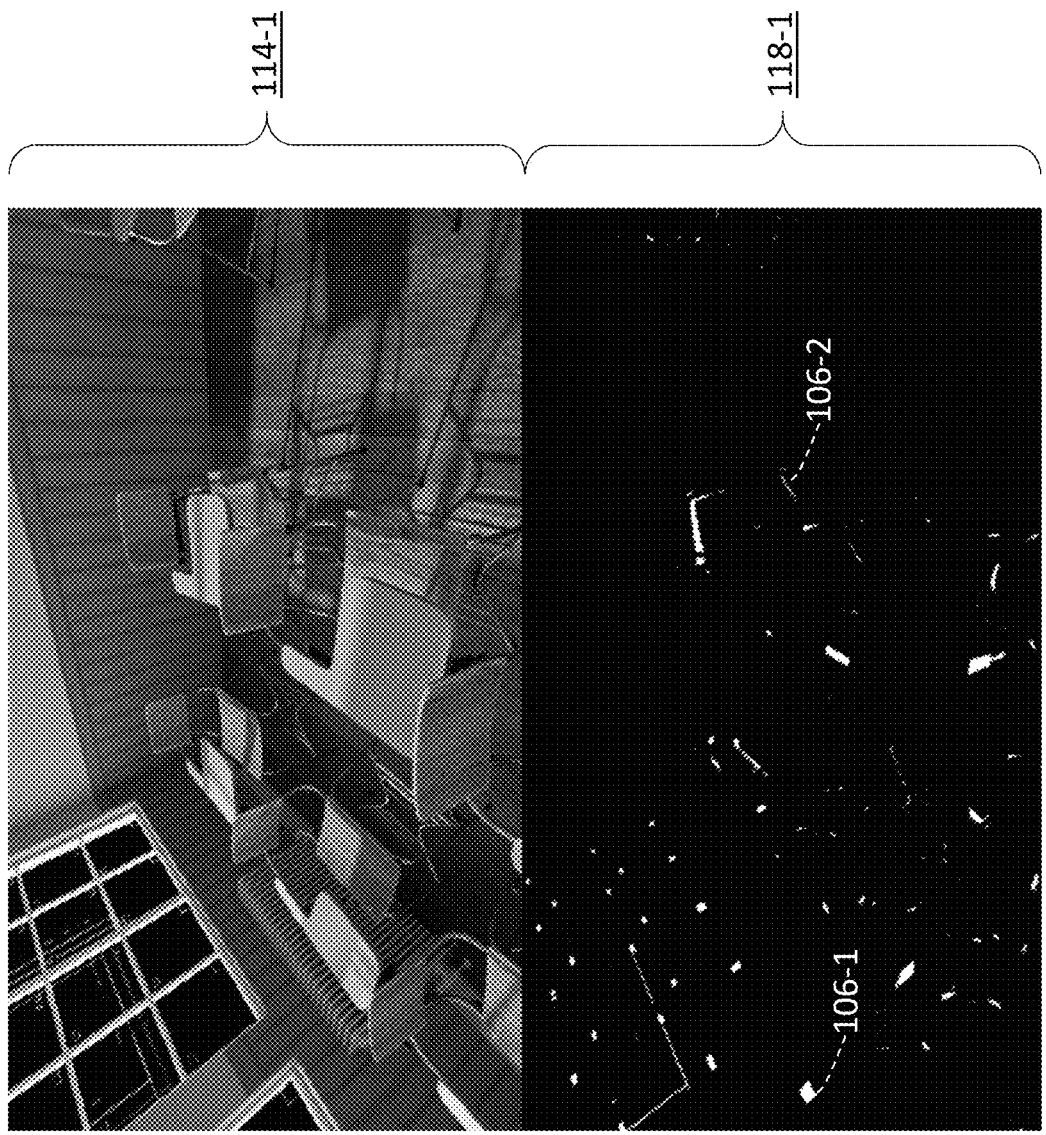
FIG. 1B illustrates example synthesized texture data and a corresponding texture hole mask in a synthesized view.

FIG. 1B illustrates example synthesized texture data 114-1 and a corresponding texture hole mask 118-1 in a synthesized view generated from one or more views and their corresponding depth images using DIBR operations.

As shown in the texture hole mask (118-1), the texture data (114-1) depicts an image with one or more texture hole regions such as 106-1, 106-2, etc., in which pixels contain no available image data and/or corresponding depth information in associated depth data. These pixels in the texture hole regions (e.g., 106-1, 106-2, etc.) may represent disoccluded portions of an image (or image frame) depicted by the synthesized texture data (114-1) that were previously occluded (e.g., hidden behind visual objects, etc.) in pre-synthesized views used to generate the synthesized views.

Since the pre-synthesized views have those disoccluded portions occluded, the pre-synthesized views do no contain texture data portions for these texture hole regions (or disoccluded portions) of the image depicted by the synthesized texture data (114-1).

Under techniques as described herein, for each texture hole region as indicated in the texture hole mask (118-1), bordering pixels of the hole region can be located first. Then, (e.g., automatic, one-dimensional, for generating at most two clusters, etc.) clustering is performed on depth values (e.g., distance values, disparity values, etc.) of those bordering pixels of the texture hole region, thereby generating a depth value threshold (e.g., a distance value threshold, a disparity value threshold, etc.) for distinguishing background depth values from foreground object depth values for the texture hole region.

Figure 1C:
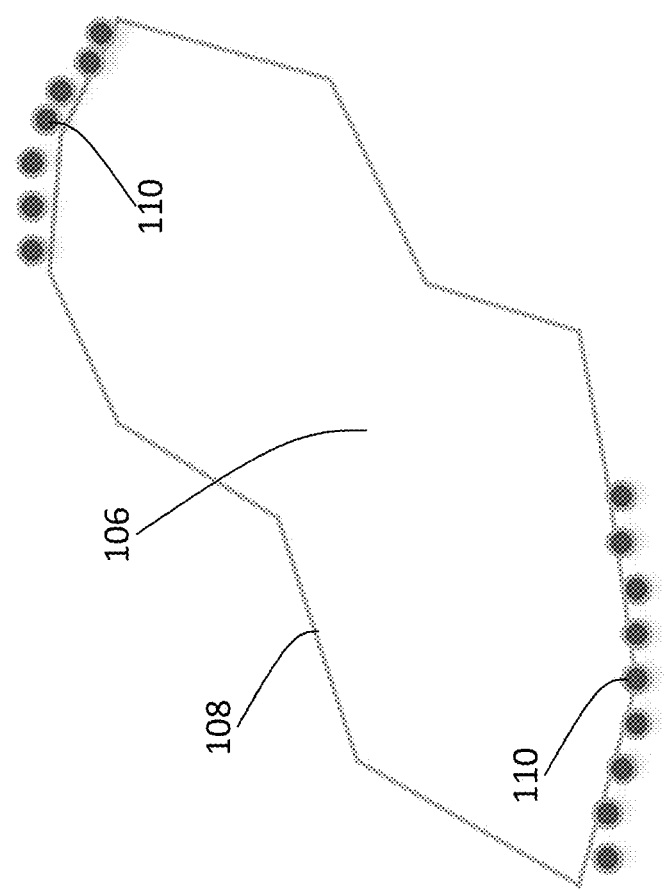
FIG. 1C illustrates an example texture hole region.

FIG. 1C illustrates an example texture hole region 106. Initially, bordering pixels of the texture hole region may be identified as pixels along a texture hole region border 108 demarcating the texture hole region (106). The texture hole region border (108) may be a closed border if the texture hole region (106) lies inside the image frame. The texture hole region border (108) may be an open border if the texture hole region (106) has a border portion coinciding with the overall border of the image (or the image frame) depicted in the synthesized texture data (e.g., 114, 114-1, etc.).

The bordering pixels lie outside in immediate adjacency to the texture hold region border (108) and have valid (texture) pixel values in the synthesized texture data (e.g., 114, 114-1, etc.). Depth values for the bordering pixels are in the associated depth data (e.g., 116, etc.). These depth values for the bordering pixels may be identified based on the associated depth data (e.g., 116, etc.) generated for the synthesized texture data (e.g., 114, 114-1, etc.). The identified depth values for the bordering pixels can be (e.g., automatically, in one dimensional, for generating at most two clusters, etc.) clustered into two depth value clusters along with a depth value threshold (e.g., a distance value threshold, a disparity value threshold, etc.) that separates the two mutually exclusive depth value clusters. Correspondingly, based on which depth value clusters bordering pixels belong, the bordering pixels can be clustered into two mutually exclusive bordering pixel clusters. More specifically, any bordering pixels (among all the bordering pixels delineating the texture hole region (106)) with depth values in the first depth value clusters of the two depth value clusters can be clustered into a first bordering pixel cluster of the two bordering pixel clusters. Any bordering pixels (among all the bordering pixels delineating the texture hole region (106)) with depth values in the second depth value clusters of the two depth value clusters can be clustered into a second bordering pixel cluster of the two bordering pixel clusters.

One of the two bordering pixel clusters can then be identified as a cluster of background pixels. In an example, if the depth values and the depth value threshold are measured or represented in distance values (or z-values), then one of the two bordering pixel clusters comprises bordering pixels with depth values greater than the depth value threshold (represented as a distance value threshold); these bordering pixels are deemed or considered to be bordering background pixels while bordering pixels in the other of the two bordering pixel clusters are declared, deemed and/or considered to be foreground pixels. In another example, if the depth values and the depth value threshold are measured or represented in disparity values, then one of the two bordering pixel clusters comprises bordering pixels with depth values no greater than the depth value threshold (represented as a disparity value threshold); these bordering pixels are deemed or considered to be bordering background pixels while bordering pixels in the other of the two bordering pixel clusters are declared, deemed and/or considered to be foreground pixels.

By way of illustration but not limitation, a (e.g., proper, etc.) subset of bordering pixels such as shown as (dots) 110 of FIG. 1C may be identified as bordering background pixels for the texture hole region (106) through clustering.

Any combination of a wide variety of (e.g., automatic, etc.) clustering operations/methods/algorithms may be used to (e.g., automatically, with no or little human intervention, etc.) determine a depth value threshold and cluster depth values of bordering pixels as described herein into two depth value clusters with the depth value threshold. Some or all of these clustering operations/methods/algorithms may be used to perform clustering with a distance measure by minimizing intra-cluster distances of clustering samples (e.g., depth values, etc.) while maximizing the inter-cluster distance between the two depth value clusters.

Under techniques as described herein, the bordering background pixels (110) may be used as a template for predicting pixel values for hole pixels located in the texture hole region (106). The pixel values may be predicted for the hole pixels from a plurality of candidate prediction directions. These candidate directions may be discretized angles that are distributed in some or all 360 angular degrees surrounding any hole pixel or any texture hole region (e.g., 106).

4. Prediction Directions and References

Figure 2A:
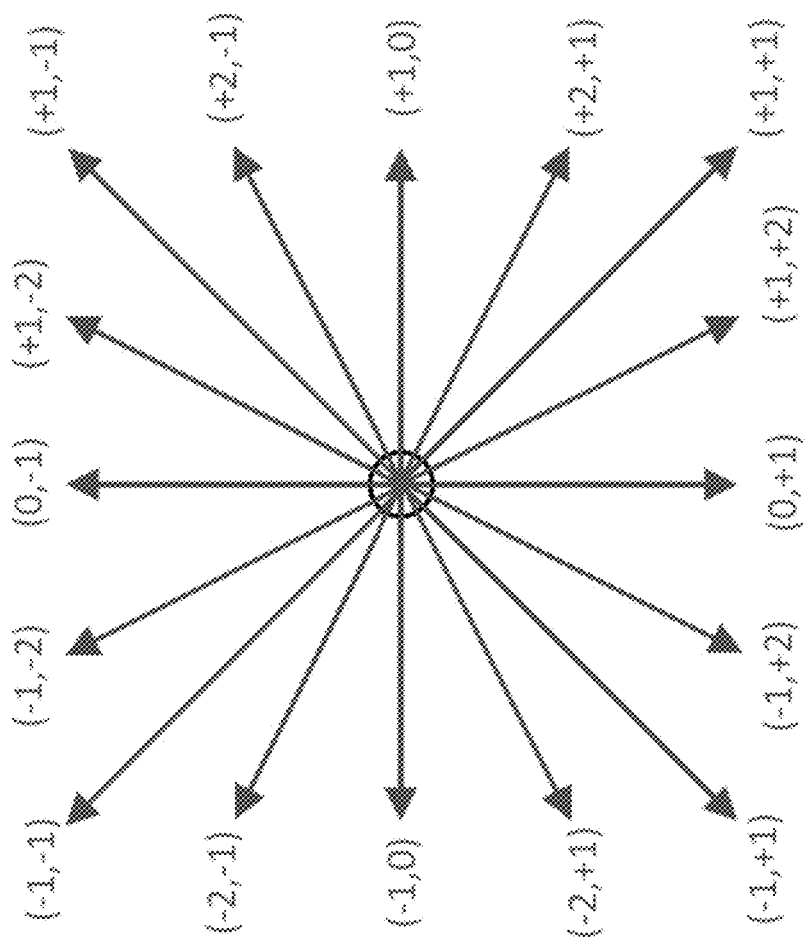
FIG. 2A illustrates example candidate prediction directions.

FIG. 2A illustrates (e.g., sixteen, fewer than sixteen, more than sixteen, etc.) example candidate prediction directions that may be used to predict pixel values of hole pixels in a texture hole region (e.g., 106, 106-1, 106-2, etc.). Each of the candidate prediction directions may be represented by a two-dimensional (2D) offset (or displacement) vector. For example, one of the candidate prediction directions may be represented as a 2D offset vector (+1, −1), which means offset of +1 in the horizontal direction and −1 in the vertical direction, assuming the positive direction for the horizontal direction is from left to right and the positive direction for the vertical direction is from top to bottom.

A reference for prediction may be used to compute prediction errors for a given candidate prediction direction represented by a 2D offset vector. The reference may be designated or located by the two-dimensional displacement vector pointing away from a template comprising bordering background pixels of the texture hole region.

In the present example in which the 2D offset vector for the candidate prediction direction is (+1, −1), pixel positions of reference pixels in the reference corresponding to the candidate prediction direction can be determined by moving pixel positions of the template to the right by (a horizontal offset of) one (1) pixel and up by (a vertical offset of) one (1) pixel.

In a further example in which a second 2D offset vector for a second candidate prediction direction is (+2, −1), pixel positions of second reference pixels in a second reference corresponding to the second candidate prediction direction can be determined by moving pixel positions of the template to the right by (a horizontal offset of) two (2) pixel and up by (a vertical offset of) one (1) pixel.

Multiple different references corresponding to multiple different candidate prediction directions can be found by (e.g., repeatedly, recursively, iteratively, etc.) selecting multiple different 2D offset vectors representing the multiple different candidate prediction directions and moving the template by way of horizontal and vertical offsets as indicated by the multiple different 2D offset vectors.

The optimal prediction direction can be selected or identified, among some or all the candidate prediction directions, by (e.g., exhaustive, full, substantially full, etc.) search as a prediction direction that generates the minimum prediction error among all prediction errors generated for the considered candidate prediction directions.

Figure 2B:
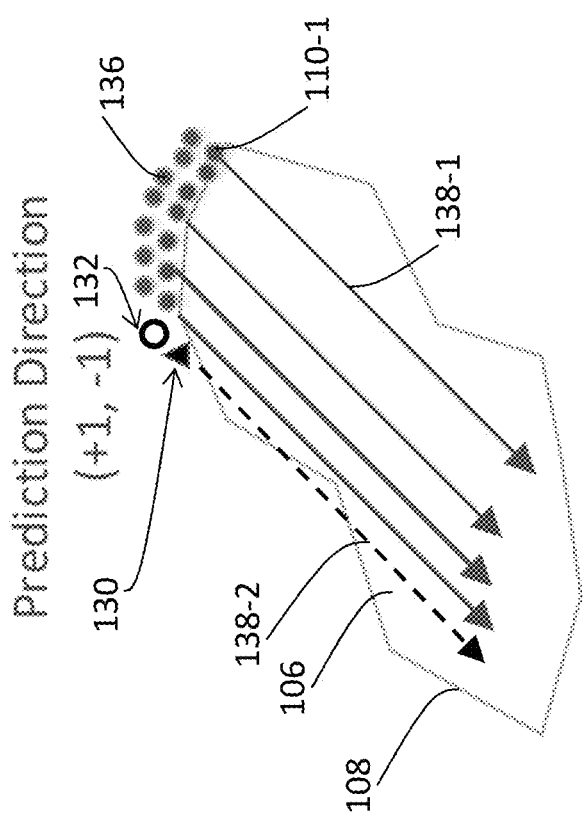
FIG. 2B and FIG. 2C illustrate example texture hole filling by prediction.

As illustrated in FIG. 2B, a 2D prediction-direction-dependent pixel filling order may be determined for each candidate prediction direction.

More specifically, if the horizontal offset of a 2D offset vector representing a candidate prediction direction is positive (assuming the positive horizontal direction is from left to right), then a horizontal pixel filling order of the 2D prediction-direction-dependent pixel filling order is from right to left. Otherwise, if the horizontal offset of the 2D offset vector is negative, then the horizontal pixel filling order of the 2D prediction-direction-dependent pixel filling order is from left to right.

If a vertical offset of the 2D offset vector is positive (assuming the positive vertical direction is from top to bottom), then a vertical pixel filling order of the 2D prediction-direction-dependent pixel filling order is from bottom to top. Otherwise, if the vertical offset of the 2D offset vector is negative, then the vertical pixel filling order of the 2D prediction-direction-dependent pixel filling order is from top to bottom.

FIG. 2B illustrates example texture hole filling by prediction (e.g., for each candidate prediction direction as illustrated in FIG. 2A, etc.). By way of illustration but not limitation, a candidate prediction direction is represented by a 2D offset vector (+1, −1).

A reference for prediction with the candidate prediction direction comprise reference pixels located at reference pixel locations. The reference pixel locations can be obtained by moving (e.g., with or without a scale factor, etc.) pixel locations of template pixels—used to fill or predict a texture hole region 106—of a template (e.g., the bordering background pixels (110-1), the bordering non-background pixels (130), etc.).

The reference pixels in the reference may include reference pixels 136 and 132 at pixel locations obtained by moving pixel locations of bordering background pixels 110-1 and bordering non-background pixels 130 in the template.

As shown, a 2D prediction-direction-dependent pixel filling order (e.g., 138-1, 138-2, etc.) may be selected or determined based on the candidate prediction direction. In some embodiments, the 2D prediction-direction-dependent pixel filling order (e.g., 138-1, 138-2, etc.) may be selected to be opposite to a direction that is used to locate reference pixels from the prediction template.

Depending on the candidate prediction direction, the prediction template may or may not comprise all bordering pixels along a texture hole region border 108 that delineates the texture hole region (106). In various embodiments, the bordering background pixels (110-1) included in the prediction template may or may not comprise all bordering background pixels (e.g., 110 of FIG. 1C).

Using the 2D prediction-direction-dependent pixel filling order (e.g., 138-1, 138-2, etc.), the prediction template can be used to fill the texture hole region (106) by assigning or propagating pixel values of template pixels in the prediction template to texture hole pixels in the texture hole region (106).

More specifically, pixel values of the bordering background pixels (110-1) in the prediction template are propagated through the texture hole region (106) along the 2D prediction-direction-dependent pixel filling order (e.g., 138-1, 138-2, opposite to the direction used to locate the reference pixels, etc.).

For some texture hole pixels along the 2D prediction-direction-dependent pixel filling order (e.g., 138-2, etc.), border pixels—which would otherwise be used for filling along the 2D prediction-direction-dependent pixel filling order (e.g., 138-2, etc.) if these border pixels were background pixels—are non-background pixels.

Instead of using pixel values of the (bordering) non-background pixels for propagation or prediction (e.g., along the direction 138-2, etc.), an average background pixel value that is obtained based on some or all bordering background pixels of the texture hole region (106) may be used for propagation or prediction along the 2D prediction-direction-dependent pixel filling order (e.g., 138-2, etc.). In an example, the average background pixel value is obtained based on all the bordering background pixels (e.g., 110 of FIG. 1C, etc.) of the texture hole region (106). In another example, the average background pixel value is obtained based on all the bordering background pixels—e.g., all the bordering background pixels (110-1) used in the prediction template—of the texture hole region (106) that in their own right have been used to fill at least one texture hole pixel in a texture hole region (e.g., 106, etc.).

Whenever an average background pixel value is used to fill a texture hole pixel in a texture hole region for a specific candidate prediction direction, a number-of-missing-pixel (NMP) counter for the specific candidate prediction direction is incremented, which records the total number of missing pixels (NMP) for the texture hole region in prediction based on the specific candidate prediction direction. The higher the value of the NMP counter is for the texture hole region for the specific candidate prediction direction, the less accurate the prediction for the specific candidate prediction direction is deemed to be for the texture hole region.

A prediction error may be computed for each candidate prediction direction. Any combination in one or more of a wide variety of measures, objective functions, prediction errors, etc., may be used compute the prediction error. By way of example but not limitation, the prediction error may be computed as a sum of absolute difference (SAD), or as a sum of all individual absolute differences between a template pixel (among bordering background pixels) of the texture hole region and the reference pixel value of a respective reference pixel (located by the candidate prediction direction, etc.).

In an example, for a candidate prediction direction and its prediction-direction-dependent pixel filling order (138-1), an individual absolute difference may be computed for candidate prediction direction as an absolute difference of the pixel value of a bordering background pixel (e.g., 110, a template pixel, etc.) used to propagate to the texture hole region and the pixel value of a reference pixel (e.g., 136, etc.) located by moving the location of the bordering background pixel (e.g., 110, etc.) along the candidate prediction direction.

In another example, for a candidate prediction direction and its prediction-direction-dependent pixel filling order (138-2), an individual absolute difference may be computed for the candidate prediction direction as an absolute difference of the pixel value of an average bordering pixel value used to propagate to the texture hole region and the pixel value of a reference pixel (e.g., 132, etc.) located by moving the location of a corresponding bordering non-background pixel (e.g., 130, etc.) along the candidate prediction direction.

The best (or optimal) prediction direction may be selected or identified from among all candidate prediction directions based on a number of quality measures/indicators such as their respective SAD values, their respective NMP counter values, and so forth, individually or in combination.

Figure 4A:
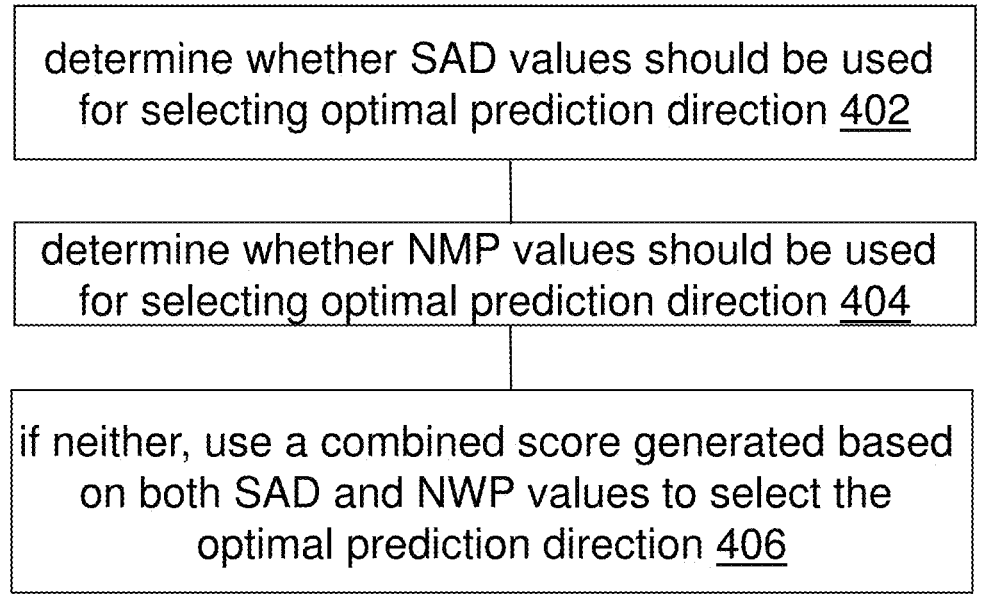

FIG. 4A illustrates an example heuristic using both SAD values and NMP counter values to select or identify the best prediction direction from among the plurality of candidate prediction directions. The heuristics may be performed by a video codec (e.g., a video decoder, a video encoder, a video transcoder, a video streaming server, a video streaming client, etc.) implemented with one or more computing devices.

Block 402 comprises determining whether the second lowest SAD value among all SAD values of all the candidate prediction directions is greater than the lowest SAD value among all the SAD values by more than a SAD value difference threshold (e.g., 50%, etc.). Additionally, optionally or alternatively, block 402 further comprises determining whether the second lowest NMP counter value among all NMP counter values of all the candidate prediction directions is less than the lowest NMP counter value among all the NMP counter values by less than an NMP counter value difference threshold (e.g., 3, etc.). In response to determining that the second lowest SAD value is greater than the lowest SAD value by more than the SAD value difference threshold and that the second lowest NMP counter value is less than the lowest NMP counter value by less than the NMP counter value difference threshold, then the candidate prediction direction with the lowest SAD value is selected as the best prediction direction among all the candidate prediction directions.

Block 404 comprises determining whether the lowest SAD value among all the SAD values of all the candidate prediction directions is greater than a SAD value threshold (e.g., 50.0, etc.). In response to determining that the lowest SAD value is greater than the SAD value threshold, then the candidate prediction direction with the lowest NMP counter value is selected as the best prediction direction among all the candidate prediction directions.

Block 406 comprises, in response to determining that the best prediction direction is not selected in blocks 402 and 404, computing a weighted score or rank for each candidate prediction direction. In a non-limiting example, the weighted score/rank can be computed as (a*rank(SAD)+b*rank(NMP)), where a and b represent weight factors such as numeric values of 2.0 and 1.0, respectively. Here, "rank (SAD)" indicates a rank based on the SAD values, whereas "rank(NMP)" indicates a rank based on the NMP counter values. A SAD value based rank for a candidate prediction direction is higher if a SAD value for the candidate prediction direction is lower. An NMP counter value based rank for a candidate prediction direction is higher if an NMP counter value for the candidate prediction direction is lower.

FIG. 4B illustrates an example process flow for texture hole filling operations. The process flow may be performed by a video codec (e.g., a video decoder, a video encoder, a video transcoder, a video streaming server, a video streaming client, etc.) implemented with one or more computing devices.

Block 412 comprises identifying bordering pixels of a texture hole region.

Block 414 comprises splitting or clustering the bordering pixels into two pixel clusters or groups: a foreground pixel cluster/group and a background pixel cluster/group.

Block 416 comprises using a plurality of candidate prediction directions and bordering background pixels to fill in the texture hole region.

Block 418 comprises selecting a winning prediction direction (e.g., the best prediction direction, an optimal prediction direction, etc.) among all the candidate prediction directions and using the winning prediction direction to fill the texture hole regions with the (bordering) background pixels (and/or average bordering background pixel values) along directions as pointed to by the winning prediction direction.

Figure 1D:
FIG. 1D illustrates an example hole-filled image.

FIG. 1D illustrates an example hole-filled image for which hole filling operations have been performed. The hole-filled image may be generated by the hole filling operations from the synthesized texture data (e.g., 114 of FIG. 1A, 114-1 of FIG. 1B, etc.). In the hole-filled image of FIG. 1D, the texture hole regions have been significantly reduced or shrunk by the hole filling operations without introducing visual artifacts.

5. Parallel Hole-Filling Operations

Techniques as described herein can be used to implement one or more parallel hole filling methods to facilitate real-time operations and improve performance. For example, a parallel hole filling method may be implemented using multi-direction background prediction. This parallel hole filling method can be used to perform realtime hole filling operations with each texture hole pixel in (e.g., complete, full, etc.) in a texture hole region independence of other realtime hole filling operations with any other texture hole pixel in the same or a different texture hole region. Thus, realtime hole filling operations with any texture hole pixel can be performed (as permitted or supported by available computational resources) concurrently without any synchronization dependencies and/or data dependencies on any other realtime hole filling operations with any other texture hole pixel.

In some operational scenarios, realtime hole filling operations with each texture hole pixel can be implemented (e.g., supported by an available processing thread, etc.) in a digital signal processor or DSP (e.g., single instruction multiple data or SIMD, etc.) or a graphics processing unit or GPU such as CUDA-based GPU, commercially available from Nvidia Corporation, Santa Clara, Calif.

A synthesized image with texture hole regions can be processed pixel by pixel in parallel. For example, each texture pixel can be processed by a CUDA thread on a Nvidia GPU. In response to determining that a currently processed pixel is not a texture hole pixel, then the thread can simply return without further processing.

On the other hand, in response to determining that the currently processed pixel is a texture hole pixel, a multi-direction search can be performed to find neighboring non-hole pixels (e.g., on, at or adjacent to a texture hole region border such as 108 that delineates or demarcates a texture hole region such as 106, etc.).

Figure 2C:
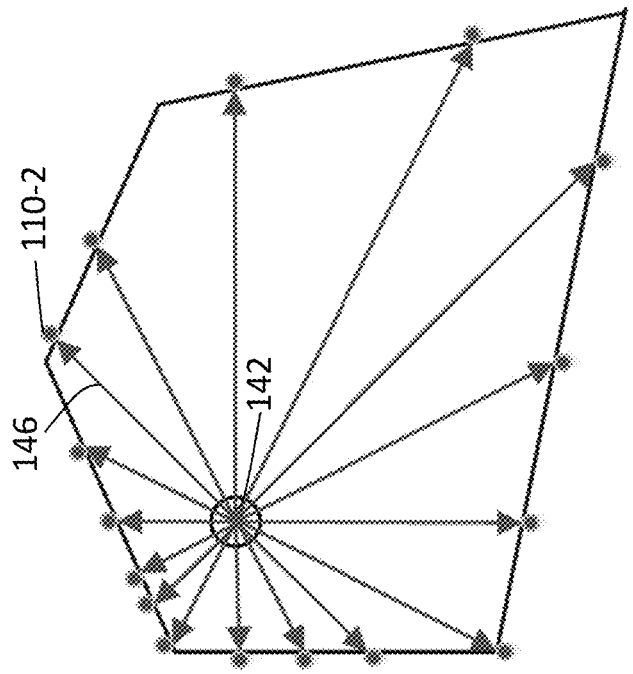
Figure 2C:
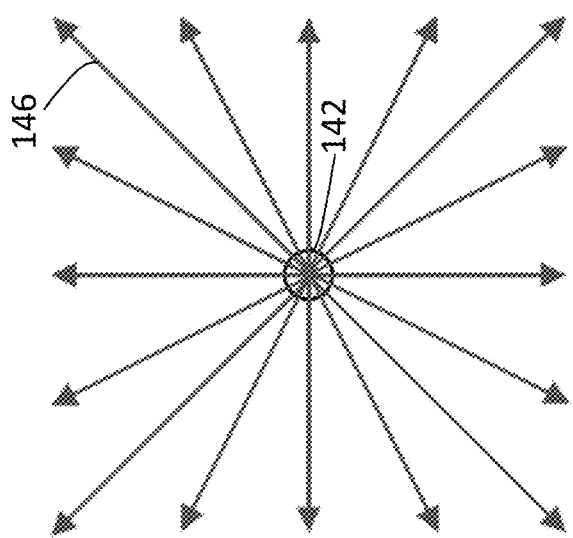

As illustrated in FIG. 2C, for a given texture hole pixel 142, searches along a plurality of (e.g., sixteen, fewer than sixteen, more than sixteen, etc.) candidate prediction directions can be performed to find neighboring or bordering non-hole pixels, each of which may be the closest non-hole pixel (e.g., 110-2 along a candidate prediction direction 146, etc.) along a respective candidate prediction direction (e.g., 146, etc.) in the plurality of candidate prediction directions. As previously discussed, each candidate prediction direction (or search direction) in the plurality of candidate prediction directions can be defined by a respective 2D offset vector in a plurality of 2D offset vectors.

Once the bordering pixels are located for all the search directions, depth values of the bordering pixels are (e.g., automatically, etc.) clustered or segmented into two depth value clusters with a depth value threshold that separates one of the depth value clusters from the other of the depth value clusters. As a result, bordering pixels with depth values (e.g., background depths, etc.) belonging to one of the two depth value clusters can be (e.g., readily, etc.) declared, identified and/or determined as background pixels or a background pixel cluster.

Those bordering pixels with depth values belonging to the background pixel cluster may or may not comprise all bordering pixels along all candidate prediction directions (or all search directions) in the plurality of candidate prediction directions.

For those candidate prediction directions that result in bordering background pixels (or bordering pixels with depth values in the background pixel cluster), predictions can be performed for each of the candidate prediction direction. More specifically, for each candidate prediction direction that results in a bordering background pixel, the texture hole pixel (142) can take up the pixel value of the bordering background pixel. An absolute difference between the pixel value of the bordering background pixel and the pixel value of a reference pixel (located by moving the bordering background pixel along the candidate prediction direction) can be computed. A sum of absolute differences can be computed by summing all individual absolute differences between a bordering background pixel and the corresponding reference pixel.

Based on prediction errors computed for all candidate prediction directions that result in the bordering background pixels, the best prediction direction can be selected, from among the candidate prediction directions, as the candidate prediction direction with the smallest prediction error. The texture hole pixel can then be filled using the bordering background pixel pointed to by the best prediction direction.

Figure 4C:
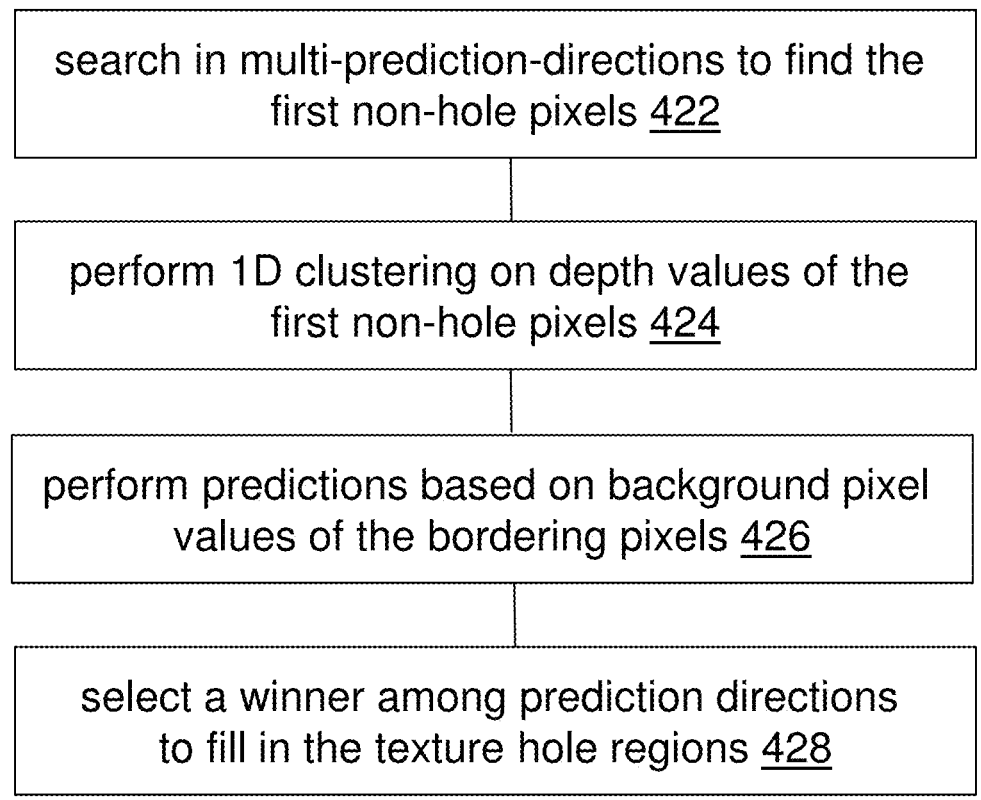

FIG. 4C illustrates an example process flow for texture hole filling operations (e.g., parallel background prediction hole filling for each hole pixel, etc.). The process flow may be performed by a video codec (e.g., a video decoder, a video encoder, a video transcoder, a video streaming server, a video streaming client, etc.) implemented with one or more computing devices.

Block 422 comprises, for a currently processed texture hole pixel, searching in multiple candidate prediction directions to find first (e.g., the closest along each direction, etc.) non-hole pixels and recording the position and depth value of each of the first non-hole pixels.

Block 424 comprises performing one-dimensional (1D) clustering on the recorded depth values to two depth value clusters, obtaining a depth value threshold used to identify one of the two depth value clusters as comprising background depths.

Block 426 comprises, for those candidate prediction directions resulting in bordering pixels with background depths, performing predictions of the pixel value of the currently processed texture hole pixel based on background pixel values of the bordering pixels.

Block 428 comprises selecting a winner (or the best prediction direction) among those candidate prediction directions resulting in bordering pixels with background depths based on prediction errors computed for all these directions.

Block 430 comprises filling the texture hole pixel with the pixel value of the winning bordering background pixel (or the bordering background pixel along the best prediction direction).

Figure 4D:
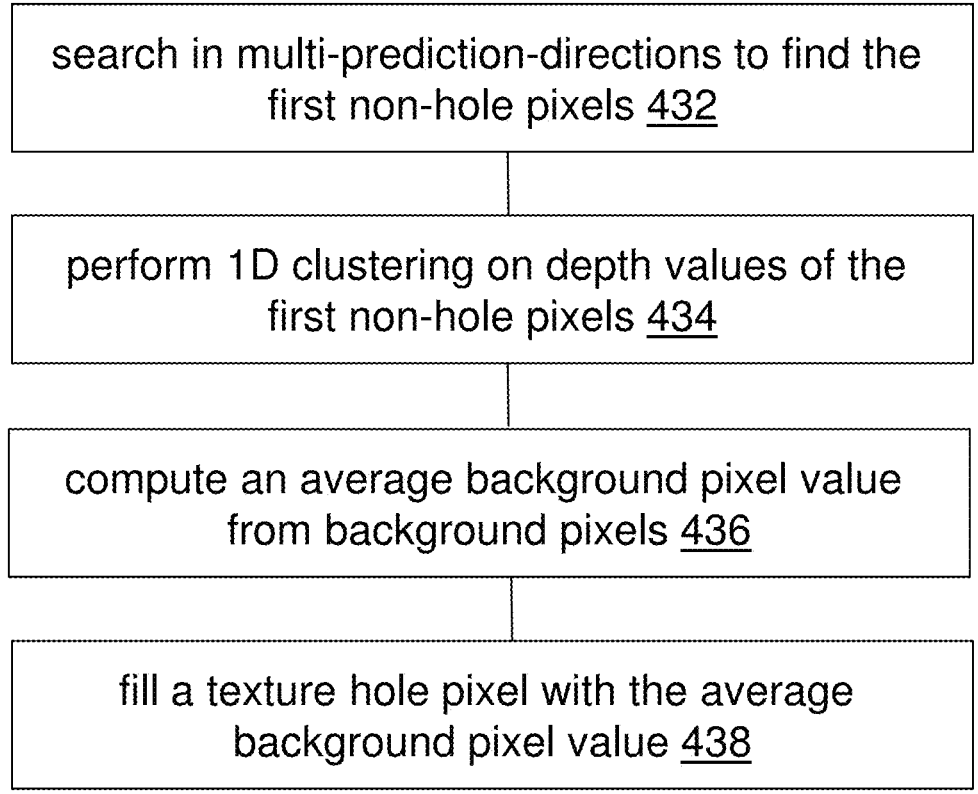

FIG. 4D illustrates an example process flow for texture hole filling operations (e.g., parallel background prediction hole filling for each hole pixel, a simplified process flow as compared with that of FIG. 4C, etc.). The process flow may be performed by a video codec (e.g., a video decoder, a video encoder, a video transcoder, a video streaming server, a video streaming client, etc.) implemented with one or more computing devices.

In some operational scenarios, to simplify (e.g., parallel, etc.) hole filling operations, an average background pixel value can be used for prediction of or filling in the pixel value of a texture hole pixel in a texture hole region.

Block 432 comprises, for a currently processed texture hole pixel, searching in multiple candidate prediction directions to find first (e.g., the closest along each direction, etc.) non-hole pixels and recording the position and depth value of each of the first non-hole pixels.

Block 434 comprises performing one-dimensional (1D) clustering on the recorded depth values to two depth value clusters, obtaining a depth value threshold used to identify one of the two depth value clusters as comprising background depths.

Block 436 comprises computing an average background pixel value of the first non-hole pixels that have been identified as background pixels.

Block 438 comprises filling the texture hole pixel with the average background pixel value.

6. Example Video Streaming Servers and Clients

Figure 3A:
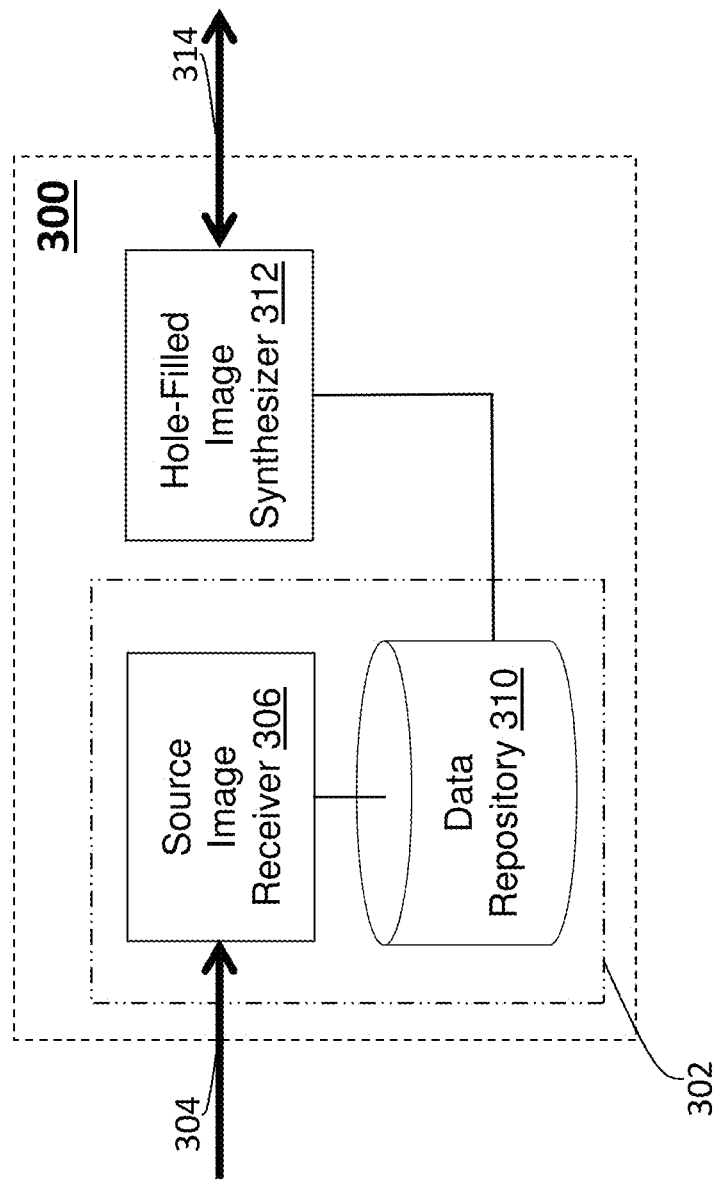
FIG. 3A through FIG. 3C illustrate example video streaming servers and clients.

FIG. 3A illustrates an example video streaming server 300 that comprises a synthesized image processor 302, a hole-filled image synthesizer 312, etc. In some embodiments, the synthesized image processor (302) comprises a source image receiver 306, a data repository 310, etc. Some or all of the components of the video streaming server (300) may be implemented by one or more devices, modules, units, etc., in software, hardware, a combination of software and hardware, etc.

In some embodiments, the source image receiver (306) comprises software, hardware, a combination of software and hardware, etc., configured to receive an input multi-view image stream 304 from a multi-view image source such as a cloud-based multi-view image source, a camera system in connection with a VR application, an AR application, a remote presence application, a display application, etc.; decode the input multi-view image stream (304) into one or more input multi-view images (e.g., a sequence of input multi-view images, 122 of FIG. 1A, etc.); etc.

In some embodiments, the data repository (310) represents one or more databases, one or more data storage units/modules/devices, etc., configured to support operations such as storing, updating, retrieving, deleting, etc., with respect to some or all of the input multi-view images, etc.

In some embodiments, the hole-filled image synthesizer (312) comprises software, hardware, a combination of software and hardware, etc., configured to generate a video stream encoded with hole-filled synthesized images derived from corresponding input multi-view images, etc. The video stream may be delivered to a downstream device via the bidirectional data flow 314 (e.g., directly or indirectly through intermediate devices, etc.). The downstream device may represent a video streaming client, a display device, a storage device, a video decoder operating with a target display, etc.

Additionally, optionally, or alternatively, some or all of image processing operations such as display management, content mapping, color mapping, etc., may be performed by the video streaming server (300).

The video streaming server (300) may be used to support real time immersive video applications, near-real-time immersive video applications, real time non-immersive video applications, near-real-time non-immersive video applications, non-real-time immersive video applications, virtual reality, augmented reality, automobile entertainment, helmet mounted display applications, heads up display applications, games, 2D display applications, 3D display applications, multi-view display applications, etc.

Figure 3B:
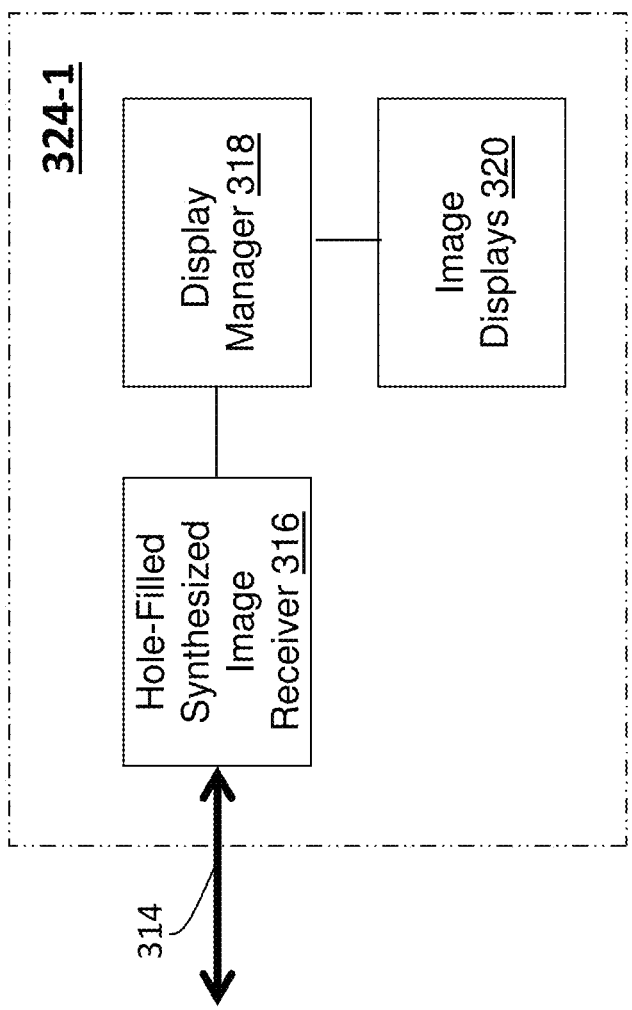

FIG. 3B illustrates an example image rendering system 324-1 that comprises a hole-filled synthesized image receiver 316, a display manager 318, one or more image displays (or one or more target displays) 320, etc. Some or all of the components of the image rendering system (324-1) may be implemented by one or more devices, modules, units, etc., in software, hardware, a combination of software and hardware, etc.

In some embodiments, the hole-filled synthesized image receiver (316) comprises software, hardware, a combination of software and hardware, etc., configured to receive a video stream encoded with hole-filled synthesized images; etc.

In some embodiments, the image rendering system (324-1) is configured to generate synthesized video content to be rendered on the user's display. In some embodiments, a hole-filled synthesized image decoded from the received video stream may be applied with display management (DM) operations (performed by the display manager (318)), de-blocking operations, de-contouring operations, blurring operations, etc., to generate display images to be rendered on the user's display.

Additionally, optionally, or alternatively, some or all of image rendering operations such as content mapping, tone mapping, color mapping, field-of-view management, prediction, etc., may be performed by the image rendering system (324-1).

The image rendering system (324-1) may be used to support real time immersive video applications, near-real-time immersive video applications, non-real-time immersive video applications, real time non-immersive video applications, near-real-time non-immersive video applications, non-real-time non-immersive video applications, virtual reality, augmented reality, automobile entertainment, helmet mounted display applications, heads up display applications, games, 2D display applications, 3D display applications, multi-view display applications, etc.

Techniques as described herein can be implemented in a variety of system architectures. Some or all image processing operations as described herein can be implemented by one or more of cloud-based video streaming servers, video streaming servers collocated with or incorporated into video streaming clients, image rendering systems, image rendering systems, display devices, etc. Based on one or more factors such as types of video applications, bandwidth/bitrate budgets, computing capabilities, resources, loads, etc., of recipient devices, computing capabilities, resources, loads, etc., of video streaming servers and/or computer networks, etc., some image processing operations can be performed by a video streaming server, while some other image processing operations can be performed by a video streaming client, an image rendering system, a display device, etc.

Figure 3C:
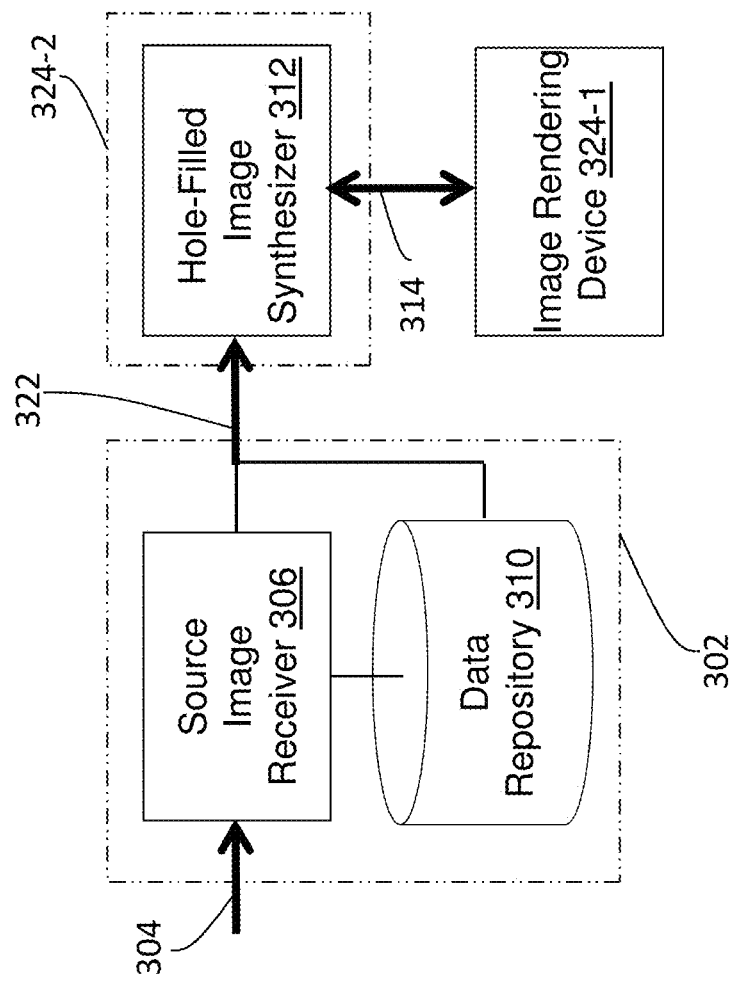

FIG. 3C illustrates an example configuration in which a hole-filled image synthesizer (e.g., 312, etc.) is incorporated into an edge video streaming server 324-2. In some embodiments, a synthesized image processor 302 of FIG. 3C may be cloud-based. In some embodiments, the synthesized image processor (302) may be located in a core network separate from edge devices such as the edge video streaming server (324-2). As in FIG. 3A, the synthesized image processor (302) may comprise a source image receiver 306, a data repository 310, etc. The synthesized image processor (302) may represent an upstream video streaming server that communicates with the edge video streaming server (324-2) over relatively high bitrates. Some or all of the components of the synthesized image processor (302) and/or the edge video streaming server (324-2) may be implemented by one or more devices, modules, units, etc., in software, hardware, a combination of software and hardware, etc.

In some embodiments, the synthesized image processor (302) is configured to output multi-view images in a data flow 322 to downstream devices one of which may be the edge video streaming server (324-2).

In some embodiments, the edge video streaming server (324-2), or the hole-filled image synthesizer (312) therein, comprises software, hardware, a combination of software and hardware, etc., configured to generate a video stream encoded with hole-filled synthesized images derived from corresponding multi-view images. The video stream may be delivered to a downstream device via the bidirectional data flow 314 (e.g., directly or indirectly through intermediate devices, etc.).

In some embodiments, an image rendering device (e.g., 324-1), or a display manager (e.g., 318 of FIG. 2B) therein, comprises software, hardware, a combination of software and hardware, etc., configured to perform DM operations on hole-filled synthesized video content to be rendered on one or more image displays to generate display video content; output the display video content (e.g., in an HDMI signal, etc.) to the image displays for rendering; etc.

Some or all techniques as described herein can operate with machine learning techniques. Any, some or all operational parameters used in performing image synthesis, automatic clustering, selecting optimal prediction directions, etc., may be machine learned. Additionally, optionally or alternatively, some or all hole filling operations as described herein may operate in conjunction with other types of hole filling operations. For example, larger holes may be filled by selected textures (e.g., a jigsaw, etc.) as specified by video professionals, whereas smaller texture hole regions may be filled by background pixels that are identified using techniques as described herein. Initialization. Additionally, optionally or alternatively, some or all operational parameters used in performing image synthesis, automatic clustering, selecting optimal prediction directions, etc., may be signaled by a video encoder to a video decoder. For example, whether an average background pixel value is to be used to fill in pixel values of texture hole pixels can be signaled by a video encoder to a video decoder.

7. Example Process Flows

FIG. 4E illustrates an example process flow according to an example embodiment of the present invention. In some example embodiments, one or more computing devices or components may perform this process flow. In block 442, a synthesized image processor (e.g., a video streaming server or a video streaming client of FIG. 3A through FIG. 3C, etc.) identifies a plurality of bordering pixels delineating a texture hole region in an image.

In block 444, the synthesized image processor records a plurality of depth values of the plurality of bordering pixels, each depth value in the plurality of depth values corresponding to a respective bordering pixel in the plurality of bordering pixels.

In block 446, the synthesized image processor automatically clusters the plurality of depth values into two depth value clusters with a depth value threshold separating a first depth value cluster of the two depth value clusters from a second depth value cluster of the two depth value clusters.

In block 448, the synthesized image processor identifies one or more bordering pixels, in the plurality of bordering pixels, with depth values in the first depth value cluster as a subset of bordering background pixels in the plurality of bordering pixels.

In block 450, the synthesized image processor uses the subset of bordering background pixels to predict texture hole pixel values in the texture hole region based on a plurality of candidate prediction directions.

In block 452, the synthesized image processor computes, based at least in part on the predicted candidate texture hole pixel values in the texture hole region, one or more quality indicator values for one or more quality indicators for each candidate prediction direction in the plurality of candidate prediction directions.

In block 454, the synthesized image processor selects, based on the one or more quality indicator values for each candidate prediction direction in the plurality of candidate prediction directions, a specific candidate prediction direction from among the plurality of candidate prediction directions, the specific candidate prediction direction being used to fill in final texture hole pixel values in the texture hole region of the image.

In an embodiment, the texture hole region is identified based on a texture hole mask that comprises a binary value for each pixel in the image to indicate whether each such pixel is a texture hole pixel.

In an embodiment, the image comprises a plurality of texture hole regions that include the texture hole region.

In an embodiment, the image represents a synthesized image from applying depth-image-based rendering to one or more pre-synthesized texture images and one or more corresponding depth images.

In an embodiment, the plurality of depth values comprises one of: distance-based depth values, disparity-based depth values, etc.

In an embodiment, the plurality of depth values is automatically clustered into a background depth value cluster and a foreground depth value cluster using one or more of: a centroid-based algorithm, a density-based algorithm, a K-means clustering algorithm, Jenks natural breaks optimization, etc.

In an embodiment, the one or more quality indicators comprises one or more of: a sum-of-absolute-difference based prediction error, a number-of-missing-pixel counter, etc.

In an embodiment, a pixel value of a bordering background pixel in the subset of bordering background pixels is propagated into the texture hole region in a filling order dependent on a candidate prediction direction.

In an embodiment, the specific candidate prediction direction is signaled in an image metadata portion in a video stream encoded with the image to a downstream decoder; the downstream decoder performs hole filling operations for the texture hole region of the image based on the specific candidate prediction direction as signaled in the image metadata portion in the video stream.

In an embodiment, the method is performed by one of: a video decoder, a video encoder, a video transcoder, etc.

In an embodiment, an average pixel value of bordering background pixels in the subset of bordering background pixels is propagated into the texture hole region in a filling order dependent on a candidate prediction direction.

FIG. 4F illustrates an example process flow according to an example embodiment of the present invention. In some example embodiments, one or more computing devices or components may perform this process flow. In block 462, a synthesized image processor (e.g., a video streaming server or a video streaming client of FIG. 3A through FIG. 3C, etc.) identifies bordering pixels of a texture hole region in an image.

In block 464, the synthesized image processor automatically clusters the bordering pixels into two pixel clusters one of which represents a foreground pixel cluster and the other of which represents a background pixel cluster.

In block 466, the synthesized image processor uses a plurality of candidate prediction directions and bordering background pixels in the background pixel cluster to fill in the texture hole region.

In block 468, the synthesized image processor selects a winning prediction direction among all the candidate prediction directions based on prediction errors computed with the plurality of candidate prediction directions.

In block 470, the synthesized image processor uses the winning prediction direction to fill the texture hole regions with the background pixels along fill-in orders as pointed to by the winning prediction direction.

FIG. 4G illustrates an example process flow according to an example embodiment of the present invention. In some example embodiments, one or more computing devices or components may perform this process flow. In block 482, a synthesized image processor (e.g., a video streaming server or a video streaming client of FIG. 3A through FIG. 3C, etc.), for a currently processed texture hole pixel in a texture hole region in an image, searches in multiple candidate prediction directions to find first non-hole pixels.

In block 484, the synthesized image processor records positions and depth values of the first non-hole pixels.

In block 486, the synthesized image processor performs one-dimensional (1D) clustering on the recorded depth values to two depth value clusters and obtaining a depth value threshold that identifies one of the two depth value clusters as comprising background depths.

In an embodiment, the synthesized image processor is further configured to perform: for the candidate prediction directions resulting in bordering pixels with background depths, performing predictions of the pixel value of the currently processed texture hole pixel based on background pixel values of the bordering pixels; selecting a winner prediction direction among the candidate prediction directions resulting in bordering pixels with background depths based on prediction errors computed for the candidate prediction directions; filling the texture hole pixel with the pixel value of the winning bordering background pixel.

In an embodiment, the synthesized image processor is further configured to perform: computing an average background pixel value of the first non-hole pixels that have been identified as background pixels; filling the texture hole pixel with the average background pixel value.

In an embodiment, the method is independently performed by a processing thread for each texture hole pixel in the image.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

8. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

9. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and what is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Enumerated Exemplary Embodiments

The invention may be embodied in any of the forms described herein, including, but not limited to the following Enumerated Example Embodiments (EEEs) which describe structure, features, and functionality of some portions of the present invention.

EEE1. A computer-implemented method, comprising:
identifying a plurality of bordering pixels delineating a texture hole region in an image;
recording a plurality of depth values of the plurality of bordering pixels, each depth value in the plurality of depth values corresponding to a respective bordering pixel in the plurality of bordering pixels;
automatically clustering the plurality of depth values into two depth value clusters with a depth value threshold separating a first depth value cluster of the two depth value clusters from a second depth value cluster of the two depth value clusters;
identifying one or more bordering pixels, in the plurality of bordering pixels, with depth values in the first depth value cluster as a subset of bordering background pixels in the plurality of bordering pixels;
using the subset of bordering background pixels to predict texture hole pixel values in the texture hole region based on a plurality of candidate prediction directions;
computing, based at least in part on the predicted candidate texture hole pixel values in the texture hole region, one or more quality indicator values for one or more quality indicators for each candidate prediction direction in the plurality of candidate prediction directions;
selecting, based on the one or more quality indicator values for each candidate prediction direction in the plurality of candidate prediction directions, a specific candidate prediction direction from among the plurality of candidate prediction directions, the specific candidate prediction direction being used to fill in final texture hole pixel values in the texture hole region of the image.

EEE2. The method of EEE1, wherein the texture hole region is identified based on a texture hole mask that comprises a binary value for each pixel in the image to indicate whether each such pixel is a texture hole pixel.

EEE3. The method of EEE1, wherein the image comprises a plurality of texture hole regions that include the texture hole region.

EEE4. The method of EEE1, wherein the image represents a synthesized image from applying depth-image-based rendering to one or more pre-synthesized texture images and one or more corresponding depth images.

EEE5. The method of EEE1, wherein the plurality of depth values comprises one of: distance-based depth values or disparity-based depth values.

EEE6. The method of EEE1, wherein the plurality of depth values is automatically clustered into a background depth value cluster and a foreground depth value cluster using one or more of: a centroid-based algorithm, a density-based algorithm, a K-means clustering algorithm, or Jenks natural breaks optimization.

EEE7. The method of EEE1, wherein the one or more quality indicators comprises one or more of: a sum-of-absolute-difference based prediction error, or a number-of-missing-pixel counter.

EEE8. The method of EEE1, wherein a pixel value of a bordering background pixel in the subset of bordering background pixels is propagated into the texture hole region in a filling order dependent on a candidate prediction direction.

EEE9. The method of EEE1, wherein the specific candidate prediction direction is signaled in an image metadata portion in a video stream encoded with the image to a downstream decoder; wherein the downstream decoder performs hole filling operations for the texture hole region of the image based on the specific candidate prediction direction as signaled in the image metadata portion in the video stream.

EEE10. The method of EEE1, wherein the method is performed by one of: a video decoder, a video encoder, or a video transcoder.

EEE11. The method of EEE1, wherein an average pixel value of bordering background pixels in the subset of bordering background pixels is propagated into the texture hole region in a filling order dependent on a candidate prediction direction.

EEE12. A computer-implemented method, comprising:
identifying bordering pixels of a texture hole region in an image;
automatically clustering the bordering pixels into two pixel clusters one of which represents a foreground pixel cluster and the other of which represents a background pixel cluster;
using a plurality of candidate prediction directions and bordering background pixels in the background pixel cluster to fill in the texture hole region;
selecting a winning prediction direction among all the candidate prediction directions based on prediction errors computed with the plurality of candidate prediction directions;
using the winning prediction direction to fill the texture hole regions with the background pixels along fill-in orders as pointed to by the winning prediction direction.

EEE13. A computer-implemented method, comprising:
for a currently processed texture hole pixel in a texture hole region in an image, searching in multiple candidate prediction directions to find first non-hole pixels;
recording positions and depth values of the first non-hole pixels;
performing one-dimensional (1D) clustering on the recorded depth values to two depth value clusters and obtaining a depth value threshold that identifies one of the two depth value clusters as comprising background depths.

EEE14. The method of EEE13, further comprising:
for the candidate prediction directions resulting in bordering pixels with background depths, performing predictions of the pixel value of the currently processed texture hole pixel based on background pixel values of the bordering pixels;
selecting a winner prediction direction among the candidate prediction directions resulting in bordering pixels with background depths based on prediction errors computed for the candidate prediction directions;
filling the texture hole pixel with the pixel value of the winning bordering background pixel.

EEE15. The method of EEE13, further comprising:
computing an average background pixel value of the first non-hole pixels that have been identified as background pixels;
filling the texture hole pixel with the average background pixel value.

EEE16. The method of EEE13, wherein the method is independently performed by a processing thread for each texture hole pixel in the image.

What is claimed is:
1. A computer-implemented method, comprising:
identifying a plurality of bordering pixels delineating a texture hole region in an image;
recording a plurality of depth values of the plurality of bordering pixels, each depth value in the plurality of depth values corresponding to a respective bordering pixel in the plurality of bordering pixels;
automatically clustering the plurality of depth values into two depth value clusters with a depth value threshold separating a first depth value cluster of the two depth value clusters from a second depth value cluster of the two depth value clusters;
identifying one or more bordering pixels, in the plurality of bordering pixels, with depth values in the first depth value cluster as a subset of bordering background pixels in the plurality of bordering pixels;
using the subset of bordering background pixels to predict texture hole pixel values in the texture hole region based on a plurality of candidate prediction directions;
computing, based at least in part on the predicted candidate texture hole pixel values in the texture hole region, one or more quality indicator values for one or more quality indicators for each candidate prediction direction in the plurality of candidate prediction directions;
selecting, based on the one or more quality indicator values for each candidate prediction direction in the plurality of candidate prediction directions, a specific candidate prediction direction from among the plurality of candidate prediction directions, the specific candidate prediction direction being used to fill in final texture hole pixel values in the texture hole region of the image.

2. The method of claim 1, wherein the texture hole region is identified based on a texture hole mask that comprises a binary value for each pixel in the image to indicate whether each such pixel is a texture hole pixel.

3. The method of claim 1, wherein the image comprises a plurality of texture hole regions that include the texture hole region.

4. The method of claim 1, wherein the image represents a synthesized image from applying depth-image-based rendering to one or more pre-synthesized texture images and one or more corresponding depth images.

5. The method of claim 1, wherein the plurality of depth values comprises one of: distance-based depth values or disparity-based depth values.

6. The method of claim 1, wherein the plurality of depth values is automatically clustered into a background depth value cluster and a foreground depth value cluster using one or more of: a centroid-based algorithm, a density-based algorithm, a K-means clustering algorithm, or Jenks natural breaks optimization.

7. The method of claim 1, wherein the one or more quality indicators comprises one or more of: a sum-of-absolute-difference based prediction error, or a number-of-missing-pixel counter.

8. The method of claim 1, wherein a pixel value of a bordering background pixel in the subset of bordering background pixels is propagated into the texture hole region in a filling order dependent on a candidate prediction direction.

9. The method of claim 1, wherein the specific candidate prediction direction is signaled in an image metadata portion in a video stream encoded with the image to a downstream decoder; wherein the downstream decoder performs hole filling operations for the texture hole region of the image based on the specific candidate prediction direction as signaled in the image metadata portion in the video stream.

10. The method of claim 1, wherein the method is performed by one of: a video decoder, a video encoder, or a video transcoder.

11. The method of claim 1, wherein an average pixel value of bordering background pixels in the subset of bordering background pixels is propagated into the texture hole region in a filling order dependent on a candidate prediction direction.

12. An apparatus performing the method as recited in claim 1.

13. A system performing the method as recited in claim 1.

14. A non-transitory computer readable storage medium, storing software instructions, which when executed by one or more processors cause performance of the method recited in claim 1.

15. A computing device comprising one or more processors and one or more storage media, storing a set of instructions, which when executed by one or more processors cause performance of the method recited in claim 1.

16. A computer-implemented method, comprising:
identifying bordering pixels of a texture hole region in an image;
automatically clustering the bordering pixels into two pixel clusters one of which represents a foreground pixel cluster and the other of which represents a background pixel cluster;
using a plurality of candidate prediction directions and bordering background pixels in the background pixel cluster to fill in the texture hole region;
selecting a winning prediction direction among all the candidate prediction directions based on prediction errors computed with the plurality of candidate prediction directions;
using the winning prediction direction to fill the texture hole regions with the background pixels along fill-in orders as pointed to by the winning prediction direction.

17. A computer-implemented method, comprising:
for a currently processed texture hole pixel in a texture hole region in an image, searching in multiple candidate prediction directions to find first non-hole pixels;
recording positions and depth values of the first non-hole pixels;
performing one-dimensional (1D) clustering on the recorded depth values to two depth value clusters and obtaining a depth value threshold that identifies one of the two depth value clusters as comprising background depths.

18. The method of claim 17, further comprising:
for the candidate prediction directions resulting in bordering pixels with background depths, performing predictions of the pixel value of the currently processed texture hole pixel based on background pixel values of the bordering pixels;
selecting a winner prediction direction among the candidate prediction directions resulting in bordering pixels with background depths based on prediction errors computed for the candidate prediction directions;
filling the texture hole pixel with the pixel value of the winning bordering background pixel.

19. The method of claim 17, further comprising:
computing an average background pixel value of the first non-hole pixels that have been identified as background pixels;
filling the texture hole pixel with the average background pixel value.

20. The method of claim 17, wherein the method is independently performed by a processing thread for each texture hole pixel in the image.

* * * * *